United States Patent
Singh et al.

(10) Patent No.: US 6,789,187 B2
(45) Date of Patent: Sep. 7, 2004

(54) PROCESSOR RESET AND INSTRUCTION FETCHES

(75) Inventors: Ravi P. Singh, Austin, TX (US); Charles P. Roth, Austin, TX (US); Ravi Kolagotla, Austin, TX (US); Juan G. Revilla, Austin, TX (US)

(73) Assignees: Intel Corporation, Santa Clara, CA (US); Analog Devices, Inc., Norwood, MA (US)

(*) Notice: Subject to any disclaimer, the term of this patent is extended or adjusted under 35 U.S.C. 154(b) by 596 days.

(21) Appl. No.: 09/738,082

(22) Filed: Dec. 15, 2000

(65) Prior Publication Data
US 2002/0078336 A1 Jun. 20, 2002

(51) Int. Cl.[7] .................... G06F 15/177; G06F 12/00
(52) U.S. Cl. ................... 713/1; 713/2; 711/166
(58) Field of Search .................. 713/1, 2; 711/154, 711/166, 150; 712/205, 209, 210, 207

(56) References Cited

U.S. PATENT DOCUMENTS

| | | | | |
|---|---|---|---|---|
| 4,429,366 A | * | 1/1984 | Kennon .................. | 700/292 |
| 4,698,748 A | * | 10/1987 | Juzswik et al. ............ | 713/322 |
| 4,729,091 A | | 3/1988 | Freeman et al. | |
| 4,791,557 A | * | 12/1988 | Angel et al. ............... | 712/244 |
| 5,057,999 A | * | 10/1991 | Kase et al. ................ | 712/205 |
| 5,168,547 A | * | 12/1992 | Miller et al. ............... | 710/1 |
| 5,226,138 A | * | 7/1993 | Shermis ................... | 711/3 |
| 5,576,650 A | * | 11/1996 | Hirotani et al. ............ | 327/142 |
| 5,659,712 A | * | 8/1997 | Divivier et al. ............ | 711/154 |
| 5,680,564 A | * | 10/1997 | Divivier et al. ............ | 712/205 |
| 5,724,533 A | * | 3/1998 | Kuslak et al. ............. | 712/205 |
| 5,761,469 A | * | 6/1998 | Greenley ................. | 712/210 |
| 5,850,563 A | * | 12/1998 | Loper et al. .............. | 712/23 |
| 5,867,684 A | * | 2/1999 | Kahle et al. .............. | 712/218 |
| 5,897,654 A | * | 4/1999 | Eisen et al. .............. | 711/131 |
| 6,055,625 A | * | 4/2000 | Nakada et al. ............ | 712/216 |
| 6,076,161 A | * | 6/2000 | Ho .......................... | 713/2 |
| 6,173,396 B1 | * | 1/2001 | Mohr ....................... | 713/1 |
| 6,292,883 B1 | * | 9/2001 | Augusteijn et al. ......... | 712/209 |
| 6,330,667 B1 | | 12/2001 | Klein | |
| 6,349,072 B1 | * | 2/2002 | Origasa et al. ............ | 365/233 |
| 6,401,197 B1 | * | 6/2002 | Kondo ...................... | 713/1 |
| 6,581,138 B2 | * | 6/2003 | Gelman .................... | 711/125 |
| 6,665,795 B1 | * | 12/2003 | Roth et al. ................ | 713/1 |
| 6,697,931 B1 | * | 2/2004 | Jones et al. ............... | 712/38 |

FOREIGN PATENT DOCUMENTS

| | | | |
|---|---|---|---|
| JP | 55-124803 | * | 9/1980 |
| JP | 57-23151 | * | 2/1982 |
| JP | 62-202234 | * | 9/1987 |

* cited by examiner

Primary Examiner—Timothy Lee
Assistant Examiner—Chun Cao
(74) Attorney, Agent, or Firm—Fish & Richardson P.C.

(57) ABSTRACT

In one embodiment, a method is disclosed for holding instruction fetch requests of a processor in an extended reset. Fetch requests are disabled when the processor undergoes a reset. When the reset is completed, fetch requests remain disabled when the instruction memory is being loaded. When loading of the instruction memory is completed, fetch requests are enabled.

22 Claims, 5 Drawing Sheets

PROCESSOR RESET AND INSTRUCTION FETCHES

BACKGROUND

This invention relates to programmable processors.

A programmable processor, such as a microprocessor for a computer or a digital signal processing system, typically includes memory that holds instructions to be executed by the processor. In addition, the processor typically supports a reset operation, in which the processor is initialized into a known state. A reset is used, for example, when the processor is powered up. In a reset operation, the memory used to hold instructions is typically reset to a known state, resulting in the loss of instructions stored in the memory.

DETAILED DESCRIPTION

Figure 1:
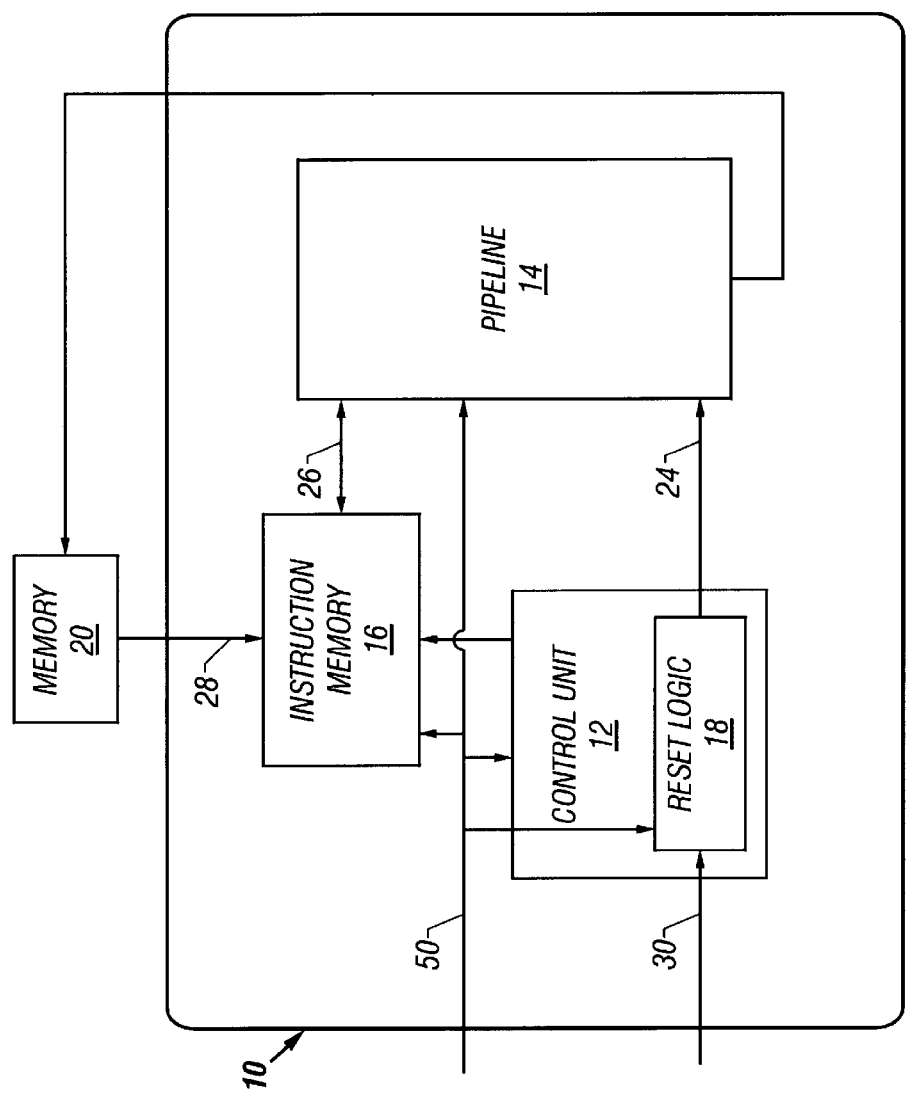
FIG. 1 is a block diagram illustrating an example of a pipelined programmable processor.

FIG. 1 is a block diagram illustrating a programmable processor 10 having an execution pipeline 14, a control unit 12 and instruction memory 16. Instruction memory 16 holds instructions to be executed by pipeline 14. Instruction memory 16, shown in FIG. 1 as included within processor 10, may also be external to processor 10. Control unit 12 controls the flow of instructions and data through pipeline 14. During the processing of an instruction, for example, control unit 12 may direct the various components of pipeline 14 to decode the instruction and correctly perform the corresponding operation. Control unit 12 may also manage instruction memory 16 and typically may perform other functions as well.

Instruction memory 16 typically includes volatile memory such as static random access memory (SRAM). Memory 20, which is shown in FIG. 1 as external to processor 10, may include non-volatile memory elements such as flash memory, read-only memory, or a floppy disk. Memory 20 may also be included within processor 10. Pipeline 14 has direct access 26 to instruction memory 16, allowing instructions to be sent directly to pipeline 14 from instruction memory 16 without intervention by control unit 12. When pipeline 14 fetches an instruction, pipeline 14 tries to find the instruction in instruction memory 16. The techniques described below allow for instruction memory 16 to be loaded with instructions before instruction fetching begins.

From time to time, processor 10 undergoes a reset. A reset sets pipeline 14 to a prescribed state. While processor 10 undergoes a reset, instruction memory 16 likewise undergoes a reset. The reset may result in the loss of instructions stored in instruction memory 16. Instructions may be restored to instruction memory 16 by loading the instructions from memory 20 into instruction memory 16. Normally instructions may be loaded into instruction memory 16 from memory 20 by way of a direct memory access (DMA) 28. Pipeline 14 does not fetch new instructions from instruction memory 16 during the reset, but may be ready to fetch instructions from instruction memory 16 following the reset. Fetching instructions following the reset may be inefficient, however, because the instructions are not located in the newly-reset instruction memory 16, and the instructions must be obtained from memory 20. The techniques described below improve efficiency by suspending instruction fetching until instruction memory 16 is loaded.

In FIG. 1, control unit 12 includes reset logic 18. Reset logic 18 may also be separate from control unit 12. When processor 10 enters a reset, a flag bit indicative of a reset in progress is set and stored in a memory element, such as a register. This flag bit, which will be discussed in more detail below as "Reset_Signal" 50, is cleared when the reset of processor 10 is terminated. As shown in FIG. 1, Reset_Signal 50 is a reset signal generated external to processor 10, and may come from, for example, an event controller or another processor cooperating with processor 10. Reset_Signal 50 may result from, for example, a general reset of systems cooperating with processor 10. Although not shown in FIG. 1, Reset_Signal 50 may be distinguished from the reset signal supplied to processor 10, which may initiate a reset service routine. Reset_Signal 50 is received by reset logic 18. Reset logic 18 also receives a signal 30 that indicates that instructions are to be loaded into instruction memory 16. Signal 30 will be discussed below as "IM_Init" signal 30. The output of reset logic 18 is an extended reset signal discussed below as "Ext_Reset_Signal" 24, which controls fetch requests to instruction memory 16 by pipeline 14. When Ext_Reset_Signal 24 is set, fetch requests are suspended, and when Ext_Reset_Signal 24 is cleared, fetch requests commence.

Figure 2:
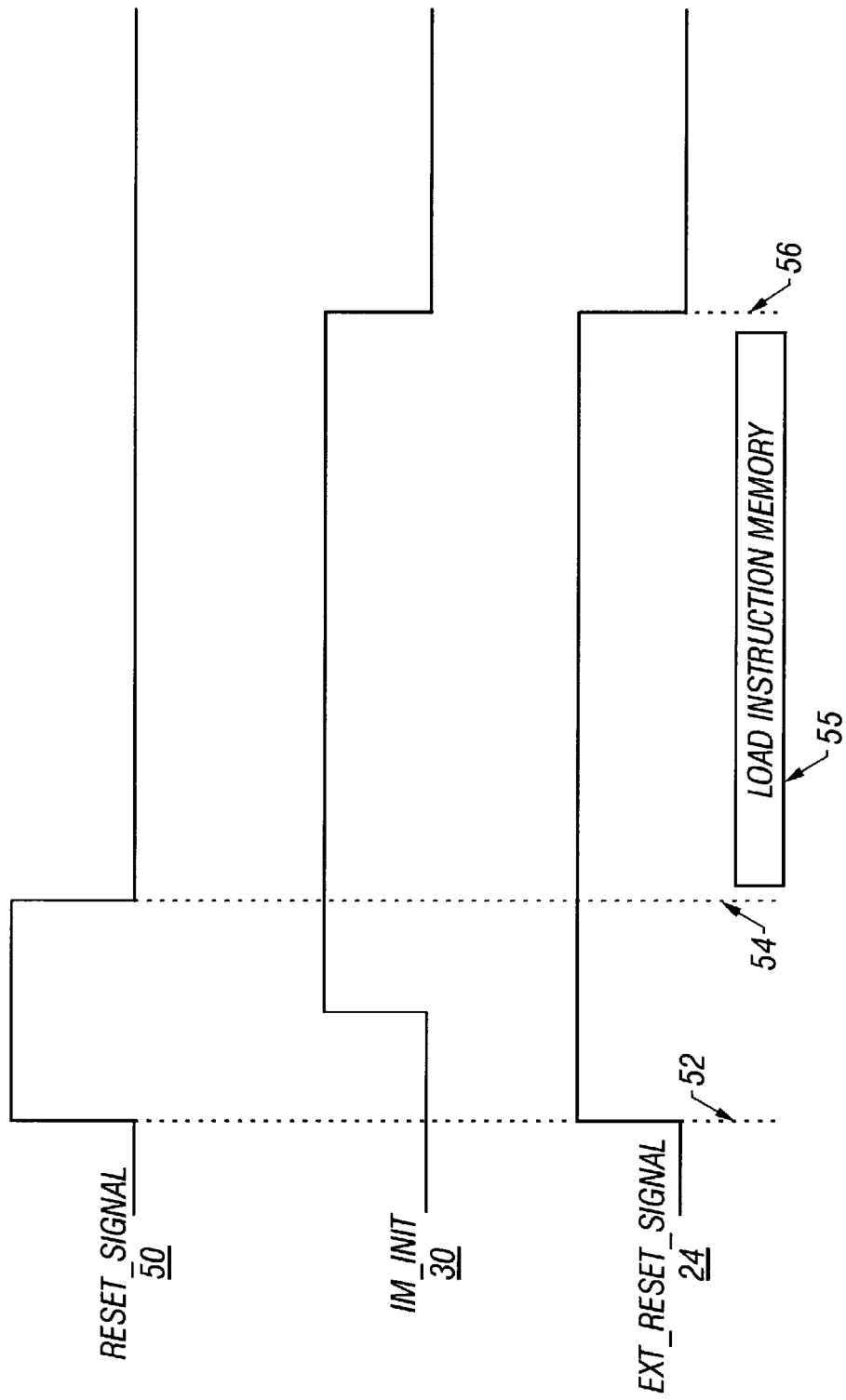
FIG. 2 is a signal timing diagram.

FIG. 2 shows a timing diagram. When processor 10 is placed in ordinary reset mode, as designated by reference line 52, Reset_Signal 50 is asserted and indicates that processor 10 is in an ordinary reset mode. When processor 10 completes resetting operations, Reset_Signal 50 is cleared, as designated by reference line 54. If instruction memory 16 is to be loaded, IM_Init 30 is set. Once resetting operations are completed (54), instruction memory 16 is loaded (55). IM_Init 30 remains set until loading of instruction memory 16 has been completed, then IM_Init 30 is cleared, as designated by reference line 56.

Ordinarily, pipeline 14 is ready to fetch instructions immediately after resetting operations are completed (54). When pipeline 14 is ready to fetch instructions, instruction memory 16 is usually not ready, and will not be ready until instructions are loaded from memory 20. When instruction memory 16 comprises SRAM, for example, an instruction ordinarily cannot be fetched by pipeline 14 until the instruction is loaded into instruction memory 16. By controlling fetch requests to instruction memory 16 with extended reset signal Ext_Reset_Signal 24, fetch requests are suspended while processor 10 is resetting and while instruction memory 16 is being loaded. Ext_Reset_Signal 24 is set when Reset_Signal 50 is set (52), and Ext_Reset_Signal 24 is cleared when IM_Init 30 is cleared (56). When Ext_Reset_Signal 24 is cleared (56), fetch requests to instruction memory 16 commence.

Figure 3:
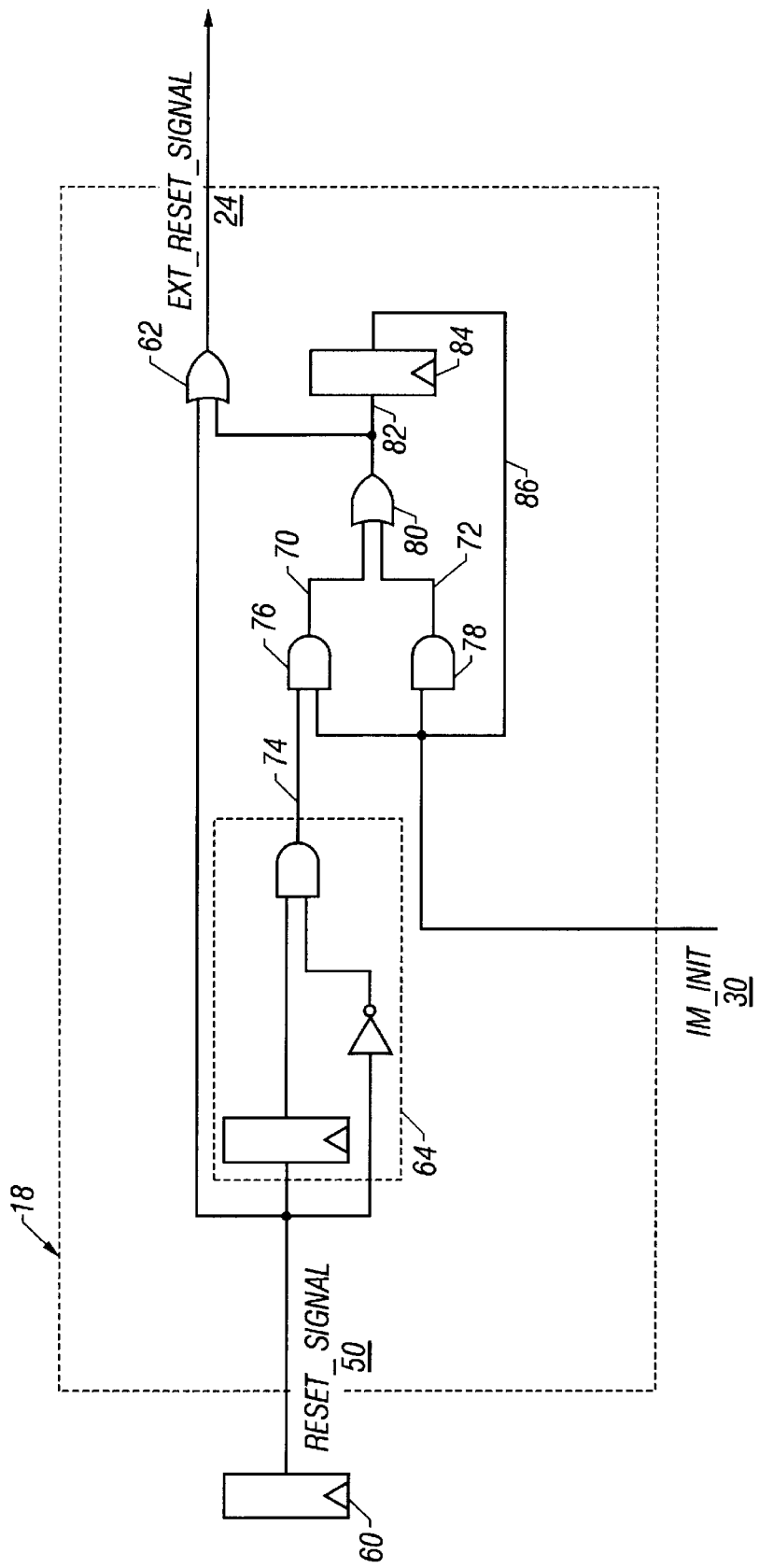
FIG. 3 is a diagram of reset logic.

FIG. 3 illustrates an embodiment of reset logic 18. The logic shown in FIG. 3 is exemplary and is not intended to limit the scope of the invention. The output of reset logic 18, Ext_Reset_Signal 24 controls the fetch requests of pipeline 14 by suspending fetch requests as long as Ext Reset Signal 24 is asserted. The inputs to reset logic 18 are Reset_Signal 50 and IM_Init 30.

When processor 10 begins reset operations, Reset_Signal 50 is asserted. Reset_Signal 50 is stored in a memory element, such as register 60. As long as processor 10 is in ordinary reset mode, Reset_Signal 50 is asserted. When processor 10 completes reset operations and ordinary reset mode ends, Reset_Signal 50 is cleared. OR gate 62 assures that Ext_Reset_Signal 24 will be asserted, and pipeline 14 will not fetch instructions, at least until Reset_Signal 50 clears.

OR gate 62 further assures that when instruction memory 16 loading occurs following the ordinary reset, Ext_Reset_Signal 24 will remain asserted until the loading is completed. When instruction memory 16 loading is not desired, i.e., when IM_Init 30 is not asserted, Ext_Reset_Signal 24 follows Reset_Signal 50 and consequently pipeline 14 does not enter an extended reset state. When, however, IM_Init 30 is asserted while Reset_Signal 50 is asserted and before Reset_Signal 50 clears, Ext_Reset_Signal 24 does not follow Reset_Signal 50, and will not clear until IM_Init 30 clears.

When IM_Init 30 is asserted while Reset_Signal 50 is asserted, IM_Init 30 has no immediate effect upon Ext_Reset_Signal 24. Falling edge detector 64 senses Reset_Signal 50, and generates a voltage low output 74 until Reset_Signal 50 is cleared. When Reset_Signal 50 is cleared, falling edge detector 64 produces a voltage high signal 74 for one clock cycle. The voltage high signal 74 and asserted IM_Init signal 30 result in a voltage high signal 70 from AND gate 76, which in turn results in output 82 of OR gate 80 going high. The voltage high output 82 of OR gate 80 is applied to OR gate 62, keeping Ext_Reset_Signal 24 high even though Reset_Signal 50 has been cleared. In addition, the voltage high output 82 of OR gate 80 is captured by register 84, is delayed one clock cycle by register 84 and is fed back to AND gate 78. Output 72 of AND gate 78 remains high as long as IM_Init 30 is asserted. When IM_Init 30 is cleared, output 72 of AND gate 78 and output 82 of OR gate 80 go low. Consequently, both inputs to OR gate 62 are low, which results in Ext_Reset_Signal 24 being cleared.

Figure 4:
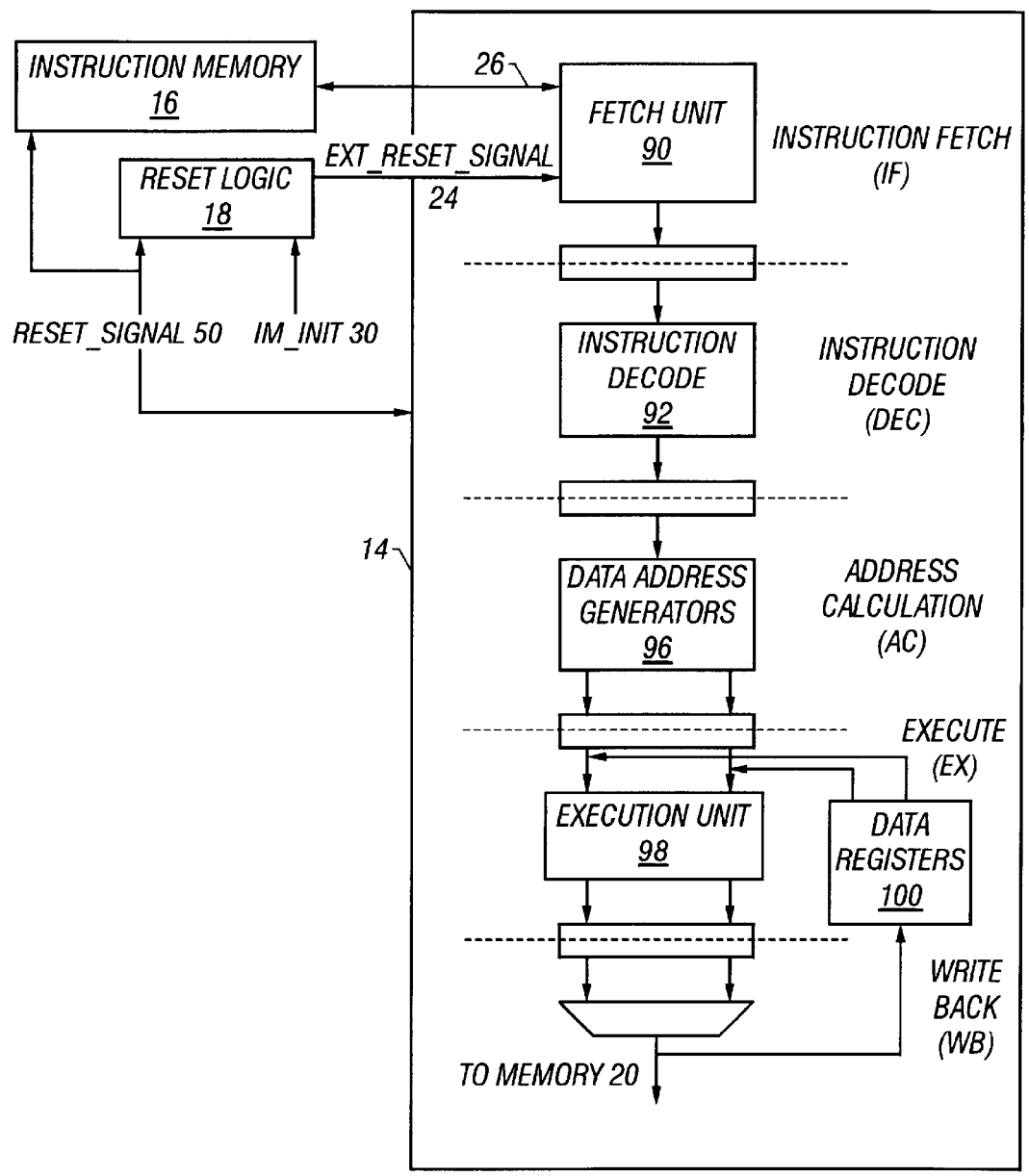
FIG. 4 is a schematic illustrating an example execution pipeline.

FIG. 4 shows an exemplary pipeline 14. Pipeline 14 has five stages: instruction fetch (IF), instruction decode (DEC), address calculation (AC), execute (EX) and write back (WB). Instructions are fetched from instruction memory 16 during the first stage (IF) by fetch unit 90 and are decoded 92 during the second stage (DEC). At the next clock cycle, the results are passed to the third stage (AC), where data address generators 96 calculate any memory addresses to perform the operation. During the execution stage (EX), execution unit 98 performs the specified operation such as, for example, adding or multiplying two numbers. During the final stage (WB), the results may be written back to memory 20 or to data registers 100.

Reset logic 18 supplies Ext_Reset_Signal 24 to fetch unit 90. Ext_Reset_Signal 24 regulates the fetching of instructions from instruction memory 16. Typical fetch units may include one or more elements that may be regulated by Ext_Reset_Signal 24. Ext_Reset_Signal 24 may, for example, enable or disable the request logic that allows instructions to be fetched from instruction memory 16, or may enable or disable an instruction register.

Figure 5:
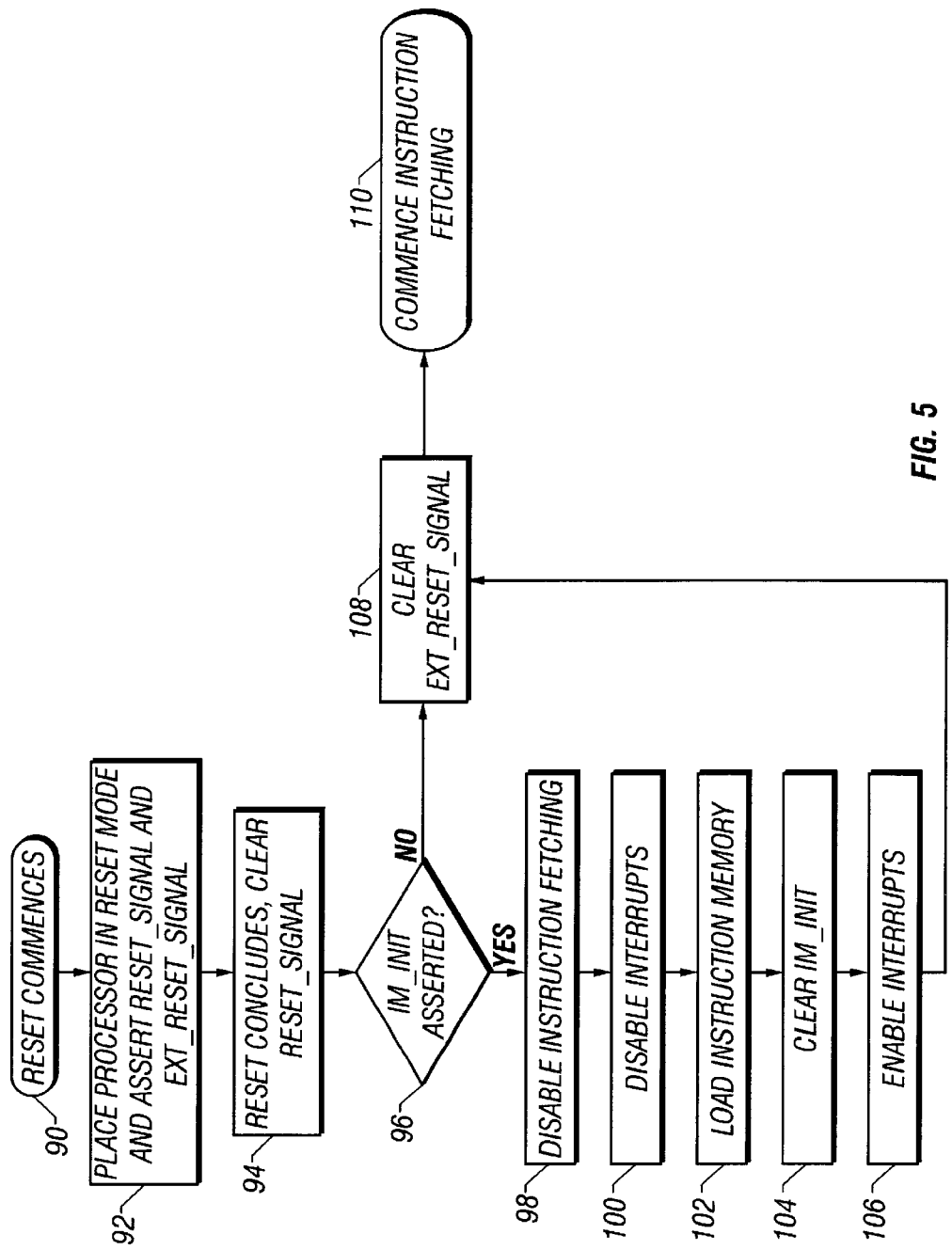
FIG. 5 is a flowchart illustrating a process for extending a reset.

FIG. 5 is a flowchart illustrating an embodiment of the techniques described above. When processor 10 is placed in reset mode (90), processor 10 asserts Reset_Signal 50 (92). Asserting Reset_Signal 50 results in the asserting of Ext_Reset_Signal 24 as well (92). Once reset operations are completed, Reset_Signal 50 is cleared (94). When Reset_Signal 50 is cleared, reset logic 18 senses whether IM_Init 30 is asserted (96). When IM_Init 30 is not asserted, Ext_Reset_Signal 50 is cleared (108) and instruction fetching commences (110). When IM_Init 30 is asserted, however, instruction fetching is disabled (98). Processor 10 optionally may disable interrupts (100) to prevent an interrupt handler from initiating fetching before loading of instruction memory 16 (102) is completed. When loading of instruction memory 16 (102) is completed, IM_Init 30 is cleared (104). Interrupts, if disabled (100), are re-enabled (106). Ext_Reset_Signal 50 is cleared (108), which enables instruction fetch requests, and instruction fetching commences (110). The first fetched instruction may be, for example, the first instruction of a reset service routine.

A number of embodiments of the invention have been described. For example, a method of resetting a processor has been described, in which fetch requests are disabled when the processor undergoes a reset, and remain disabled when the instruction memory is being loaded. The processor may be implemented in a variety of systems including general purpose computing systems, digital processing systems, laptop computers, personal digital assistants (PDA's) and cellular phones. In this context, the resetting techniques discussed above may be readily used to improve processor performance. In such a system, the processor may be coupled to a memory device, such as a FLASH memory device or a SRAM device, that stores an operating system and other software applications. These and other embodiments are within the scope of the following claims.

What is claimed is:

1. A method for resetting a processor comprising:
    entering a reset mode;
    loading an instruction memory associated with the processor;
    responsive to the reset mode and loading the instruction memory, sending an extended reset signal to a fetch unit of a pipeline, the extended reset signal having a longer duration than a reset signal; and
    responsive to the extended reset signal, suspending instruction fetches from the fetch unit of the pipeline to the instruction memory until the extended reset signal is de-asserted and the instruction memory is loaded.

2. The method of claim 1 further comprising:
    receiving an instruction memory loading signal; and
    loading the instruction memory while the instruction memory loading signal is asserted.

3. The method of claim 1 further comprising:
    asserting the extended reset signal;
    suspending instruction fetches when the extended reset signal is asserted;
    de-asserting the extended reset signal; and
    fetching instructions from the instruction memory.

4. The method of claim 3 further comprising:
    receiving a reset signal; and
    receiving an instruction memory loading signal;
    wherein the extended reset signal is asserted when the reset signal is received and when the instruction memory loading signal is received.

5. The method of claim 4 wherein the extended reset signal is cleared when the reset signal is cleared and when the instruction memory loading signal is cleared.

6. The method of claim 1 wherein suspending instruction fetches comprises disabling instruction request logic in the pipeline.

7. The method of claim 1 wherein suspending instruction fetches comprises disabling an instruction register in the pipeline.

8. The method of claim 1, further comprising disabling interrupts to prevent an interrupt handler from initiating fetching before loading of the instruction memory is completed.

9. The method of claim 1, further comprising enabling the fetch unit of the pipeline to fetch existing instructions from the instruction memory when the instruction memory is not loaded with new instructions after a reset.

10. A method comprising:

receiving a reset signal at a processor;

receiving an instruction memory loading signal at the processor;

asserting an extended reset signal in the processor when the reset signal is received at the processor, the extended reset signal having a longer duration than the reset signal; and sending the extended reset signal to a fetch unit of a pipeline in the processor.

11. The method of claim 10 wherein the extended reset signal is cleared when the instruction memory loading signal is cleared.

12. The method of claim 10 further comprising suspending instruction fetches when the extended reset signal is asserted.

13. The method of claim 12 wherein suspending instruction fetches comprises disabling instruction request logic.

14. The method of claim 12 wherein suspending instruction fetches comprises disabling an instruction register.

15. The method of claim 10 further comprising loading the instruction memory when the instruction memory loading signal is received.

16. The method of claim 10, further comprising disabling interrupts to prevent an interrupt handler from initiating fetching before loading of an instruction memory is completed.

17. An apparatus comprising:

a first input adapted to receive a reset signal;

a second input adapted to receive an instruction memory loading signal;

an output; and a circuit coupled to the first input, second input and output, adapted to provide an extended reset signal to the output based on the reset signal and the instruction memory loading signal, the circuit asserting the extended reset signal when the reset signal is received, the circuit clearing the extended reset signal when the instruction memory loading signal is cleared.

18. The apparatus of claim 17, further comprising an interrupt handler that is prevented from initiating fetching before loading of an instruction memory is completed.

19. A system comprising:

a first input adapted to receive a reset signal;

a second input adapted to receive an instruction memory loading signal;

an output;

a circuit coupled to the first input, second input and output, adapted to provide an extended reset signal to the output based on the reset signal and the instruction memory loading signal, the circuit asserting the extended reset signal when the reset signal is received, the circuit clearing the extended reset signal when the instruction memory loading signal is cleared; and a volatile memory operative to store instructions; and a pipeline operative to fetch instructions from the volatile memory and operative to receive the extended reset signal.

20. The system of claim 19, wherein the volatile memory comprises static random access memory.

21. The system of claim 19, wherein the system comprises a digital pipeline processor.

22. The system of claim 19, further comprising an interrupt handler prevented from initiating fetching before loading of the volatile memory with instructions is completed.

* * * * *